Sept. 14, 1965   W. E. SEVRENCE   3,205,727
CONTROL CABLE SEAL
Filed March 21, 1963
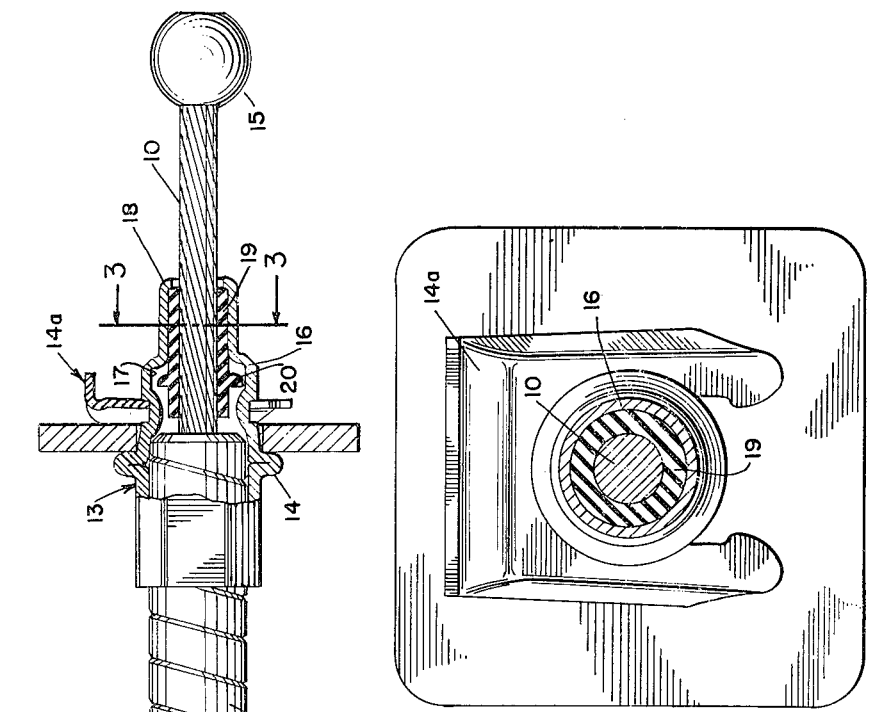
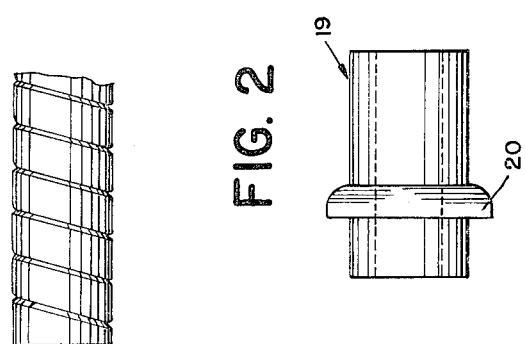
INVENTOR.
WARREN E. SEVRENCE
BY
ATTORNEYS

United States Patent Office 3,205,727
Patented Sept. 14, 1965

3,205,727
CONTROL CABLE SEAL
Warren E. Sevrence, Adrian, Mich., assignor to American Chain & Cable Company, Inc., New York, N.Y., a corporation of New York
Filed Mar. 21, 1963, Ser. No. 266,978
1 Claim. (Cl. 74—501)

This invention relates to seals for protecting the interior of control cables from entrance of moisture and other foreign matter through the end of the cable casing where a reciprocable core element is exposed. More particularly, it concerns an annular seal of elastomeric material disposed about the core element end portion and sheathed for its own protection entirely within an anchorage fitting secured to the casing.

Control cables in which a reciprocable core element transmits a push or a pull or both through a casing are often used under conditions where foreign matter may enter the casing and adversely affect their operation. It is especially common that moisture or dirt can gain access to the interior of the casing at its end where the core element is exposed and connected to an operating component. As a consequence, the inner parts of the cable rust or become clogged and its force transmission is greatly reduced in efficiency or destroyed altogether.

In an attempt to protect control cables from these adverse effects, resort has been had to exterior annular sealing elements extending beyond the end of the cable casing or its anchorage fitting and surrounding the core element in wiping engagement which produces a moisture seal. While these exterior forms of annular seals at least initially provide a satisfactory barrier to the interior of the cable casing, they have proved to be of little value in many instances because of their vulnerability to physical damage. When used in brake cable assemblies on automobiles, for example, the external wiping-type seals of the prior art are often dislodged or injured under normal service conditions. One source of this difficulty is the fact that stones and other matter thrown up by the wheels of the automobile impinge upon the external seal and damage its moisture barrier. In general, experience has shown that the exposed position of these conventional seals shortens their operating life considerably and necessitates their frequent replacement.

It is the primary object of the present invention to provide a new control cable seal uniquely combined with the end elements of a control cable assembly to achieve full protection to the interior of the assembly against entrance of moisture and dirt and at the same time to protect the sealing element itself from the damage to which it has been exposed heretofore.

Broadly stated, this invention contemplates a combination with a control cable assembly which includes a tubular casing and an annular anchorage fitting secured about an end portion of the casing and extending outwardly therefrom. A core element is reciprocable within the casing and has an end portion extending in spaced relation axially through the anchorage fittting. The improvement of the invention comprises a sheathed seal for protecting the interior of the cable assembly. This seal is provided by an annular element of elastomeric material located concentrically entirely within the anchorage fitting and surrounding the core element end portion. The annular element is in circumferential moisture-sealed engagement with the anchorage fitting and the core element end portion and is in sliding engagement with the core element end portion. In a more specific form of the new sheathed seal, it may be of resilient neoprene and be formed with a circumferential rib extending radially outwardly into a circumferential groove in the bore of the anchorage fitting.

This new seal is easily assembled simply by pressing it resiliently into the anchorage fitting before that fitting is secured to the end portion of the casing. The rib mentioned above permits the seal element to locate itself at the proper position within the anchorage fitting during assembly. Thereafter, the core element may be directed through the seal within the anchorage fitting and on into the length of the tubular casing. The moisture sealed engagement of the seal with both the inside of the anchorage fitting and the surface of the core element effectively prevents entrance of any moisture or dirt into the interior of the assembly. More importantly, the location of the annular sealing element entirely within the anchorage fitting renders it fully sheathed for protection from physical damage during use. Under all normal service conditions, this sheathed seal enclosed in the anchorage fitting is thoroughly protected from inadvertent displacement, damage from stones thrown up by the wheels of the automobile, and other sources of physical abuse.

A preferred embodiment of the invention is described hereinbelow with reference to the accompanying drawing, wherein FIG. 1 is a fragmentary elevation partly broken away showing the new seal sheathed within an anchorage fitting on a control cable assembly secured to a frame;

FIG. 2 is an enlarged elevation of the annular sealing element removed from the assembly; and FIG. 3 is an enlarged section taken along the line 3—3 of FIG. 1 of the cable assembly removed from the frame.

Referring first to FIG. 1, a typical control cable is shown for operation as an automobile rear wheel brake cable assembly. It includes an inner stranded flexible metal core element 10 surrounded throughout the greater part of the cable length by a tubular casing 11 which is defined exteriorly by a helically wrapped flat armor wire 12. At one end of the cable assembly, an annular anchorage fitting 13 is swaged about the endmost turns of the flat armor wire 12. An annular bead 14 on this fitting and a removable spring clip 14A may secure the fitting to a mounting bracket as shown. The core element 10 has an end portion projecting outwardly at the end of the anchorage fitting 13 for connection to a suitable operating component by means of a swaged ball element 15. Extending axially outwardly from the end of the casing 11 is a projecting portion 16 of the anchorage fitting 13 which has a circumferential groove 17 formed in its bore intermediate the ends thereof and a radially inwardly extending annular flange 18 at its outermost end remote from the casing 11. The core element end portion extends in spaced relation axially through the projecting portion 16 of the anchorage fitting 13 and through the annular flange 18 thereon.

The sheathed seal for protecting the interior of this assembly comprises an annular element 19 of resilient neoprene or other suitable elastomeric material. It is located concentrically entirely within the projecting portion 16 of the anchorage fitting 13 between the flange 18 and the outer end of the casing 11. The full length of the annular element 19 surrounds the end portion of the core element 10. A circumferential rib 20 is formed integrally on the annular element 19 intermediate its ends and extends radially outwardly into the groove 17 in the projecting portion 16 of the anchorage fitting. As shown in FIG. 1 the rib 20 is in radially and axially spaced relation with respect to the groove 17. The longitudinal dimensions of the annular element 19 are such that it is contained at one end by the flange 18 when its rib 20 is centrally located within the groove 17. From that position, it may be moved to a limited extent toward the casing 11 until it abuts the faced-off end of the casing armor wire 12. The radial dimensions of the annular element 19 are such that it is in resilient press-fitted contact with the bore of the anchorage fitting projecting portion 16 between the groove 17 and the flange 18 thereof. At the same time, the entire bore of the annular element 19 is in resilient press-fitted contact with the surface of the core element 10 extending therethrough. Consequently, the annular element 19 is in circumferential sliding moisture-sealing engagement with the bore of the anchorage fitting projecting portion 16 and the surface of the end portion of the core element 10.

These various elements may be assembled by first inserting the individual resilient annular element 19 into a separate anchorage fitting 13 through the larger end thereof opposite the flange 18. When the annular element 19 is pressed deformably into place its rib 20 snaps resiliently into the groove 17 of the bore of the anchorage fitting end portion 16. This insures that the annular element 19 remains in its proper location within the annular end fitting 18 during the subsequent steps of the assembly operation. Next the large end of the anchorage fitting 13 is slipped over the end portion of the tubular casing 11 and is swaged securely about the endmost turns of the flat armor wire 12. The core element 10 is then pushed through the resilient annular element 19 within the anchorage fitting 13 and on through the entire length of the casing 11. The ball element 15 is then swaged into place and the cable assembly is mounted onto the frame 14 in a suitable manner. When the core element 10 is pushed or pulled during operation, it may carry the annular element 19 back and forth to a limited extent between the flange 18 and the faced-off end of the flat wire 12 at the end of the casing 11. However, beyond that limited displacement the core element 10 slides easily in sealed relation within the bore of the annular element 19.

In the use of this cable assembly as a rear wheel brake cable for an automobile, the anchorage fitting 13 is uncovered on the underside of the automobile chassis. Under those circumstances, the anchorage fitting 13 is exposed to considerable moisture and dirt and to pebbles or stones which are thrown up against the underside of the chassis by the wheels of the automobile. The new annular element 19 provides an effective seal at the point where the core element 10 extends from the casing 11 and thus prevents entrance of moisture or dirt into the interior of the assembly. This in turn precludes rusting or clogging of the control cable parts which otherwise would seriously impair or destroy its operativeness. Not only is the interior of the assembly protected by the annular element 19 but the annular element 19 is in turn protected by the projecting portion 16 of the anchorage fitting 13 within which it is fully enclosed. But for this sheathing, the annular element 19 or any other wiping-type elastomeric seal would be highly vulnerable to severe physical damage in an exposed position on the underside of the automobile. However, no amount of flying pebbles or stones or other such forces encountered under normal service conditions can dislodge or in any way damage the new annular element 19 in its protected location sheathed within the anchorage fitting 13.

Since the particular manner of installing the improved control cable assembly is not essential to the invention, the term "anchorage fitting" in the following claim is to cover fittings which are secured to a mounting bracket as in the preferred embodiment and also fittings which are not themselves attached to any frame or bracket.

I claim:

In a control cable assembly including a casing, an annular anchorage fitting secured about the casing and extending axially outwardly therefrom, a core element reciprocable within said casing and extending in spaced relation axially through said anchorage fitting, and an annular element of elastomeric material within said anchorage fitting surrounding said core element in slidable moisture-sealed engagement therewith; the improvement which comprises a circumferential rib extending radially outwardly about said annular element, said annular element being formed with an inner circumferential groove into which said rib extends in axially spaced relation therewith, and a portion of said annular element being in slidable, moisture-sealed engagement with said anchorage fitting.

References Cited by the Examiner

UNITED STATES PATENTS 2,732,861    1/56    Gilmore _____ 74—501 X
3,081,102    3/63    Murray et al. _____ 277—178 X

FOREIGN PATENTS 14,337    10/84    Great Britain.

BROUGHTON G. DURHAM, *Primary Examiner.*

DON A. WAITE, *Examiner.*

UNITED STATES PATENT OFFICE
CERTIFICATE OF CORRECTION

Patent No. 3,205,727                              September 14, 1965

Warren E. Sevrence

It is hereby certified that error appears in the above numbered patent requiring correction and that the said Letters Patent should read as corrected below.

Column 1, line 59, for "fittting" read -- fitting --; column 4, lines 30 and 31, for "annular element", second occurrence, read -- anchorage fitting --.

Signed and sealed this 19th day of April 1966.

(SEAL)
Attest:

ERNEST W. SWIDER                              EDWARD J. BRENNER
Attesting Officer                                    Commissioner of Patents